July 14, 1931.          J. L. BECKER          1,814,427
COUPLING DEVICE
Original Filed April 12, 1928
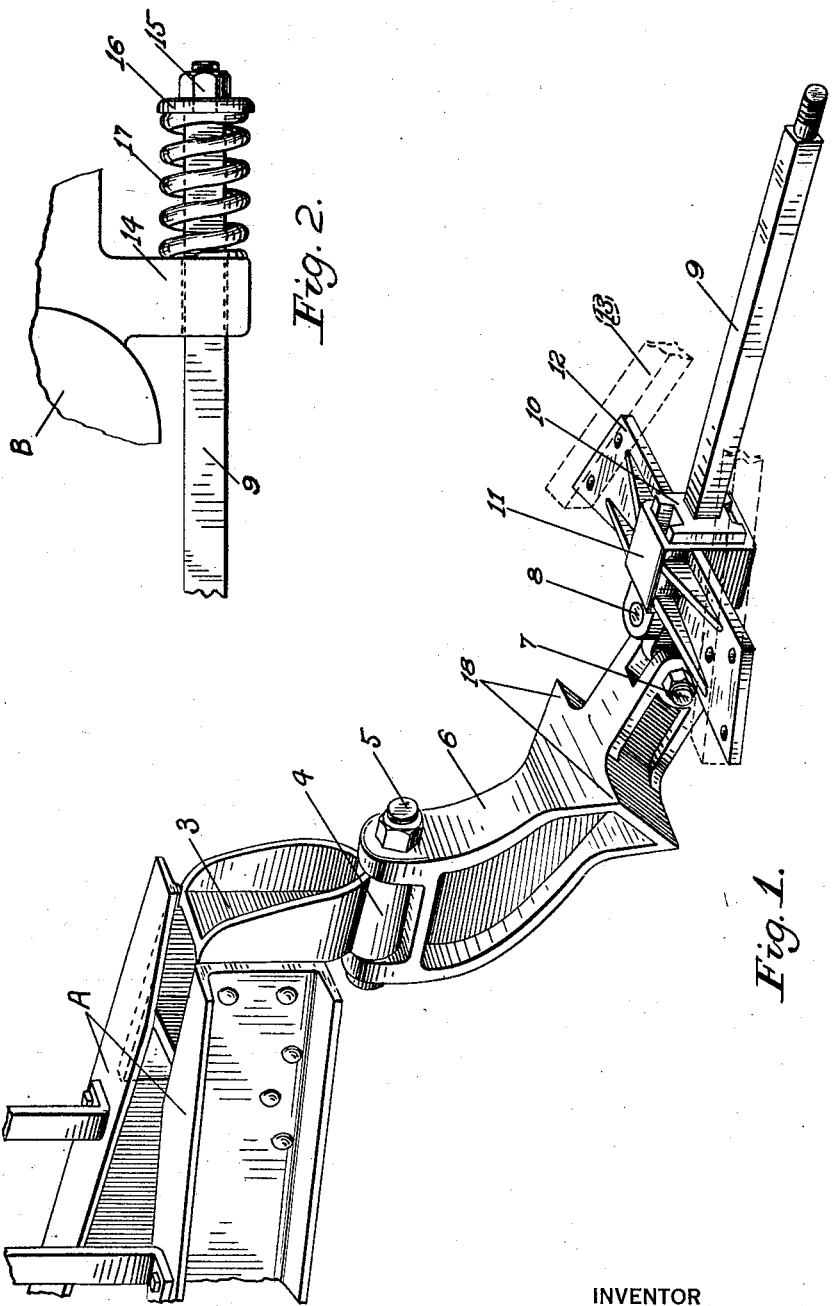
INVENTOR
JOSEPH L. BECKER
BY
ATTORNEY Patented July 14, 1931

1,814,427

UNITED STATES PATENT OFFICE

JOSEPH L. BECKER, OF STILLWATER, MINNESOTA

COUPLING DEVICE

Original application filed April 12, 1928, Serial No. 269,458. Divided and this applicaton filed November 22, 1929. Serial No. 409,102.

This invention relates to draft connections for vehicles and the primary object is to provide an efficient, practical and novel construction of coupling device that is particularly designed for connecting implements, such as road graders, behind tractors which supply the propelling power. The present application is a division of my co-pending patent application, Ser. No. 269,458, filed April 12, 1928, for road grading machine. The invention will be more fully disclosed in the course of the following specification, reference being had to the accompanying drawings, wherein:

Fig. 1 is a perspective view of my improved coupling device, with certain parts omitted for purpose of illustration.

Fig. 2 is an enlarged detail elevation showing the spring and tractor arrangement at the forward end of the device.

Referring to the drawings more particularly and by reference characters, A designates the front end of the vehicle frame to be drawn. As illustrated in my application, Ser. No. 269,458, the vehicle may be a road grading machine, and is of the type in which the frame supports the grading tools and is in turn supported, at its rear, by a pair of laterally disposed wheels, while the forward end of the frame is supported by the tractor, so that the vehicle or grading machine, as a unit, will trail behind the tractor pulling it.

The forward end of the grader or vehicle frame A is provided with a casting 3 having a horizontal bearing portion 4 which receives the pivot pin 5 of an inclined coupler member or casting 6. The lower and forward end of the casting 6 is universally connected, as by a transverse pivot 7 and a vertical pivot 8, to the rear end of a draw bar 9. This draw bar is provided, at its rear, with a guide block 10 that is slidably guided in a box shaped bearing 11 of a cross beam 12 which is rigidly secured to the tractor, frame portions of which are indicated in dotted lines as at 13. The draw bar 9 extends under the tractor, designated in Fig. 2 as B, and slidably guides a lug or bracket arm 14 that is rigid with the tractor body proper. At its forward end the draw bar is provided with a nut 15 and washer 16, between which washer and the member 14 is disposed a compression spring 17 tending to hold the draw bar forwardly. It will thus be seen that the spring 17 will have a decided influence in protecting the connected machines, with respect to jars and vibrations, and the cushioning effect thus produced is particularly beneficial to the tractor when a machine such as a road grader is being drawn, as such a machine is subject to a large amount of jarring and uneven resistance under varying road surface conditions.

It may here be noted that the coupler casting or unit 6 is provided with a pair of laterally disposed integrally formed shoulders 18, which are so arranged that they will stop or abut against the ends of the cross beam 12 or adjacent tractor parts when too sharp a turn is being attempted with the double unit machine. In such event one of the shoulders 18 will, when making such a contact, cause a pull through the bar 9 to the spring 17, thus yieldingly resisting the excessive steering angle, and insuring against the breakage of less sturdy parts which would otherwise come in contact with each other.

It is understood that suitable modifications may be made in the structure as disclosed, provided such modifications come within the spirit and scope of the appended claims. Having now therefore fully illustrated and described my invention what I claim to be new and desire to protect by Letters Patent is:

1. A coupling mechanism for supportably connecting the front end of a vehicle to a tractor, comprising a draw bar yieldably secured to the tractor, a bracket member rigidly secured at the forward end of the vehicle, and a coupler member disposed between the bracket member and draw bar to support the former on the latter, a pivot connection between the coupler and bracket members, and a universal joint connection between the draw bar and the forward end of the coupler member.

2. A coupling mechanism for supportably connecting the front end of a vehicle to a tractor, comprising a draw bar yieldably secured to the tractor, a bracket member rigidly secured at the forward end of the vehicle, and a coupler member disposed between the bracket member and draw bar to support the former on the latter, a pivot connection between the coupler and bracket members, and a universal joint connection between the draw bar and the forward end of the coupler member, said pivot connection having a horizontally disposed pivot center.

3. A coupling mechanism for supportably connecting a vehicle to a tractor, comprising a cross beam for rigid attachment to the tractor, a draw bar slidably secured in the cross beam, means tending to move the draw bar forwardly, a coupler member for supporting attachment to the vehicle, and a universal joint connecting the forward end of the coupler member to the rear end of the draw bar.

4. A coupling mechanism for connecting a vehicle to a tractor, comprising a cross beam for rigid attachment to the tractor, a draw bar slidably secured at its rear in the cross beam, means at the front end of the draw bar tending to move it forwardly, and a coupler member pivotally secured at its opposite ends to the draw bar and vehicle and adapted to support the front end of the vehicle from the draw bar.

5. A coupling mechanism for connecting a vehicle to a tractor, comprising a cross beam for rigid attachment to the tractor and having a centrally disposed bearing box, a draw bar having an enlarged rear end portion slidably secured in the bearing box, yieldable means tending to move the draw bar forwardly, a coupler member pivotally connecting the vehicle and draw bar, and laterally disposing abutments carried by the coupling member for contact with adjacent tractor or cross beam parts, to bring said yieldable means into action to resist too sharp turning movement of the tractor and vehicle with respect to each other.

6. A coupling mechanism for supportably connecting the front end of a vehicle frame to a tractor comprising a draw bar slidably secured centrally of the tractor and having a universal joint at its rear end, yieldable means tending to hold the draw bar in a forward position, a coupler casting connected at its front end to the universal joint and having a horizontal supporting pivot connection at its rear end to the vehicle frame, and laterally disposed abutments carried by the coupler casting for engagement with respect to the tractor to bring the yieldable means into action to resist too sharp turning of the tractor with respect to the vehicle drawn therebehind.

Signed at Stillwater, Minnesota, this 19th day of November 1929.

JOSEPH L. BECKER.